United States Patent
Dvorecki et al.

(10) Patent No.: US 11,762,057 B2
(45) Date of Patent: Sep. 19, 2023

(54) APPARATUS, SYSTEM AND METHOD OF COMMUNICATING RADAR SIGNALS

(71) Applicant: INTEL CORPORATION, Santa Clara, CA (US)

(72) Inventors: Nir Dvorecki, Herzeliya (IL); Yuval Amizur, Kfar-Saba (IL); Leor Banin, Petach Tikva (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/888,223

(22) Filed: Aug. 15, 2022

(65) Prior Publication Data
US 2022/0390552 A1 Dec. 8, 2022

Related U.S. Application Data

(63) Continuation of application No. 16/831,417, filed on Mar. 26, 2020, now Pat. No. 11,448,722.

(51) Int. Cl.
| | | |
|---|---|---|
| G01S 7/03 | (2006.01) |
| G01S 13/931 | (2020.01) |
| H01Q 1/32 | (2006.01) |
| H01Q 21/08 | (2006.01) |

(52) U.S. Cl.
CPC .............. *G01S 7/03* (2013.01); *G01S 13/931* (2013.01); *H01Q 1/3233* (2013.01); *H01Q 21/08* (2013.01)

(58) Field of Classification Search
CPC ......... G01S 7/03; G01S 13/931; H01Q 21/00; H01Q 21/06; H01Q 21/08
See application file for complete search history.

(56) References Cited

U.S. PATENT DOCUMENTS

| | | | | |
|---|---|---|---|---|
| 4,717,916 A | * | 1/1988 | Adams ................ | G01S 13/4454 342/107 |
| 5,663,990 A | * | 9/1997 | Bolgiano ............. | H04B 7/0671 375/138 |
| 5,842,118 A | * | 11/1998 | Wood, Jr. ............. | H04B 7/0808 342/51 |
| 6,067,053 A | * | 5/2000 | Runyon ............... | H01Q 21/205 343/820 |

(Continued)

FOREIGN PATENT DOCUMENTS

| | | |
|---|---|---|
| EP | 3 418 768 | 12/2018 |
| WO | 2018/122849 | 7/2018 |

OTHER PUBLICATIONS

"Sensor array", Retrieved from the Internet: URL:https://en.wikipedia.org/wiki/Sensor_array [retrieved on Jun. 24, 2020], 7 pages.

(Continued)

*Primary Examiner* — Peter M Bythrow
(74) *Attorney, Agent, or Firm* — Shichrur & Co.

(57) ABSTRACT

For example, an apparatus may include a radar antenna including at least one Transmit (Tx) antenna to transmit a Tx radar signal; and a plurality of Receive (Rx) antennas to receive Rx radar signals based on the Tx radar signal, wherein a distance between a first Rx antenna of the planarity of Rx antennas and a second Rx antenna of the plurality of Rx antennas, which is adjacent to the first Rx antenna, is at least ten times a wavelength of a central frequency of the Tx radar signal.

23 Claims, 7 Drawing Sheets

(56) References Cited

U.S. PATENT DOCUMENTS

| | | | | |
|---|---|---|---|---|
| 6,323,823 | B1* | 11/2001 | Wong | H01Q 25/00 343/890 |
| 6,347,234 | B1* | 2/2002 | Scherzer | H04B 7/0408 455/562.1 |
| 6,411,249 | B1* | 6/2002 | Rose | G01S 7/021 342/13 |
| 6,496,157 | B1* | 12/2002 | Mottier | H01Q 1/246 342/373 |
| 6,512,480 | B1* | 1/2003 | Reudink | H04B 7/10 342/361 |
| 6,546,043 | B1* | 4/2003 | Kong | H04B 1/7103 375/E1.031 |
| 6,801,790 | B2* | 10/2004 | Rudrapatna | H01Q 1/246 455/562.1 |
| 7,616,168 | B2* | 11/2009 | Tillery | H01Q 21/26 343/797 |
| 9,106,286 | B2* | 8/2015 | Agee | H04L 5/0007 |
| 9,570,799 | B2* | 2/2017 | Shtrom | H01Q 3/446 |
| 9,577,346 | B2* | 2/2017 | Shtrom | H01Q 9/16 |
| 9,680,545 | B2* | 6/2017 | Karaoguz | H04B 7/0617 |
| 9,869,762 | B1* | 1/2018 | Alland | H01Q 21/08 |
| 10,101,440 | B2* | 10/2018 | Kato | H01Q 21/061 |
| 10,305,622 | B1* | 5/2019 | Antonik | H04K 1/02 |
| 10,768,276 | B2* | 9/2020 | Jansen | G01S 13/931 |
| 11,448,722 | B2 | 9/2022 | Dvorecki et al. | |
| 2001/0016479 | A1* | 8/2001 | Wood, Jr. | H04B 7/0608 455/277.1 |
| 2002/0132600 | A1* | 9/2002 | Rudrapatna | H04B 7/10 455/562.1 |
| 2005/0243896 | A1* | 11/2005 | Yuan | H04J 13/00 375/146 |
| 2009/0232510 | A1* | 9/2009 | Gupta | H04L 27/2096 375/296 |
| 2010/0052986 | A1* | 3/2010 | Nink | H01Q 21/29 342/372 |
| 2011/0002371 | A1* | 1/2011 | Forenza | H04B 17/309 375/227 |
| 2012/0146844 | A1* | 6/2012 | Stirling-Gallacher | G01S 13/343 342/189 |
| 2013/0002473 | A1* | 1/2013 | Pace | G01S 13/913 342/146 |
| 2014/0139395 | A1* | 5/2014 | Solondz | H01Q 1/246 343/872 |
| 2014/0347212 | A1 | 11/2014 | Tuxen | |
| 2017/0307745 | A1 | 10/2017 | Matsui et al. | |
| 2018/0069307 | A1* | 3/2018 | Lu | H01Q 1/525 |
| 2018/0331751 | A1* | 11/2018 | Antonik | H04B 7/0669 |
| 2019/0028159 | A1* | 1/2019 | Bisiules | H01Q 5/48 |
| 2019/0074600 | A1* | 3/2019 | Bily | G01S 13/931 |
| 2019/0204435 | A1* | 7/2019 | Poiger | G01S 13/878 |
| 2019/0207322 | A1* | 7/2019 | Ding | G01S 7/03 |
| 2019/0324136 | A1* | 10/2019 | Amadjikpe | G01S 13/70 |
| 2019/0326232 | A1* | 10/2019 | Lin | H01Q 1/2283 |
| 2020/0076471 | A1* | 3/2020 | Sevic | H01Q 1/523 |
| 2020/0096626 | A1* | 3/2020 | Wang | G01S 13/4454 |
| 2020/0161757 | A1* | 5/2020 | Henry | H01Q 21/20 |
| 2020/0182995 | A1* | 6/2020 | Zeng | G01S 13/003 |
| 2020/0292663 | A1* | 9/2020 | Bai | G01S 13/42 |
| 2020/0309900 | A1* | 10/2020 | Brune | H01Q 21/005 |
| 2020/0408899 | A1* | 12/2020 | Nanzer | G01S 13/878 |
| 2021/0063532 | A1* | 3/2021 | Slobodyanyuk | G01S 13/87 |
| 2021/0100451 | A1* | 4/2021 | Cao | A61B 5/7475 |
| 2021/0119348 | A1* | 4/2021 | Won | H04B 17/11 |
| 2021/0143879 | A1* | 5/2021 | Ji | H04B 17/327 |
| 2021/0199797 | A1* | 7/2021 | Choi | G01S 7/04 |
| 2021/0242578 | A1* | 8/2021 | Inomata | H01Q 13/206 |
| 2021/0278501 | A1* | 9/2021 | Sturm | G01S 13/42 |
| 2021/0286069 | A1* | 9/2021 | Kim | G01S 13/72 |
| 2021/0293946 | A1* | 9/2021 | Kishigami | G01S 13/282 |
| 2021/0311180 | A1* | 10/2021 | Wang | G01S 13/44 |
| 2021/0311182 | A1* | 10/2021 | Sun | G01S 13/9021 |
| 2021/0320425 | A1* | 10/2021 | Arkind | H01Q 21/28 |
| 2021/0356558 | A1* | 11/2021 | Fuchs | G01S 13/345 |
| 2021/0364626 | A1* | 11/2021 | Schoor | G01S 7/356 |
| 2021/0376461 | A1* | 12/2021 | Dallal | H01Q 3/2658 |
| 2021/0382160 | A1* | 12/2021 | Schindler | G01S 13/347 |

OTHER PUBLICATIONS

Search Report for European Patent Application No. 20213188.4, dated Jun. 2, 2021, 10 pages.

Office Action for U.S. Appl. No. 16/831,417, dated Jan. 5, 2022, 31 pages.

Notice of Allowance for U.S. Appl. No. 16/831,417, dated May 11, 2022, 8 pages.

* cited by examiner

US 11,762,057 B2

APPARATUS, SYSTEM AND METHOD OF COMMUNICATING RADAR SIGNALS

TECHNICAL FIELD

Embodiments described herein generally relate to communicating radar signals.

BACKGROUND

Radar systems used for ranges up to several hundreds of meters may require simultaneous communication of transmit (Tx) and receive (Rx) signals.

Multiple Input Multiple Output (MIMO) techniques may be used in order to achieve high angular resolution of a radar system. For example, a large number of transmitters and receivers may be simultaneously used in the radar system.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
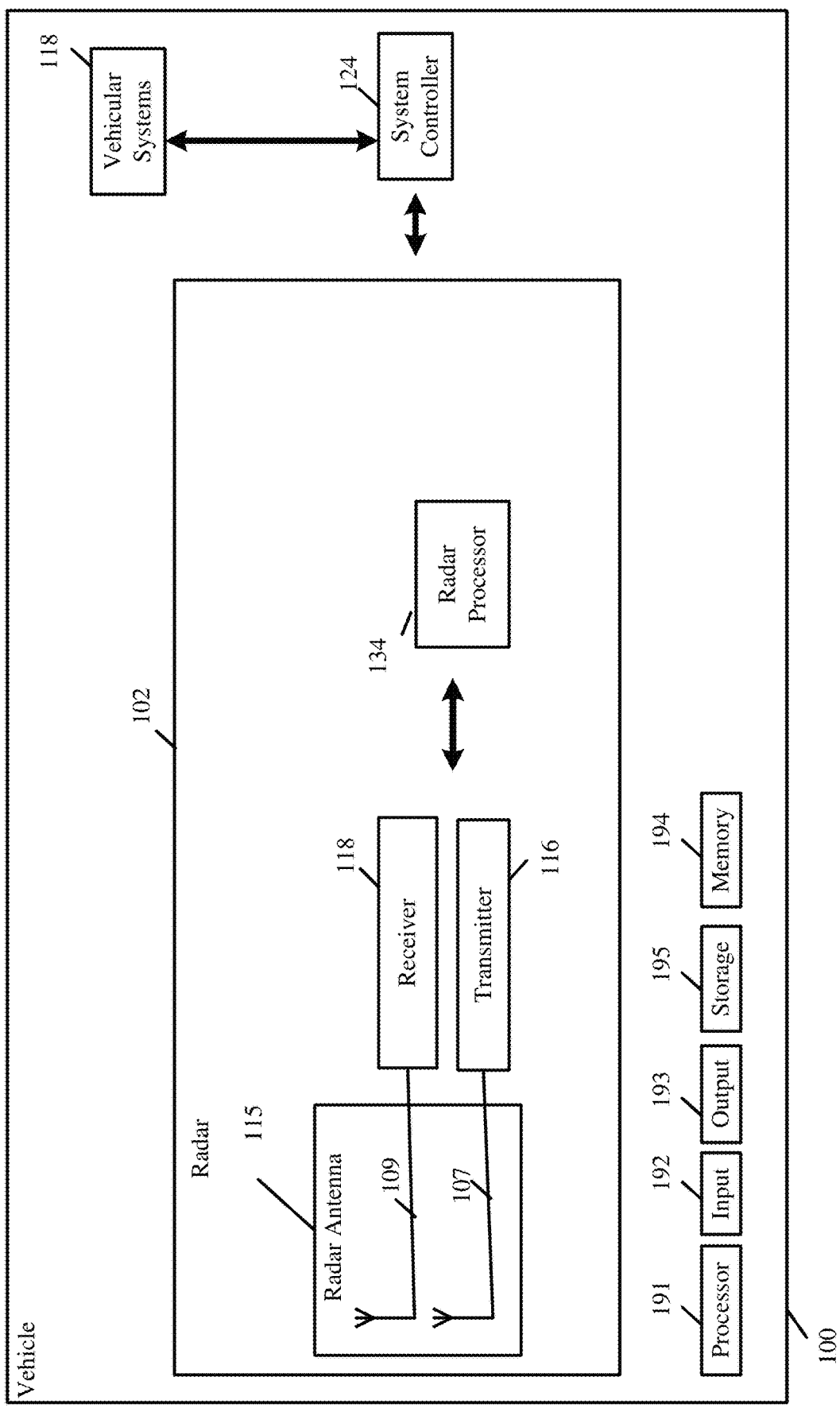
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a radar sensor, a radar device, a radar system, a vehicle, a vehicular system, an autonomous vehicular system, a vehicular communication system, a vehicular device, a sensor device, a User Equipment (UE), a Mobile Device (MD), a wireless station (STA), a sensor device, a non-vehicular device, a mobile or portable device, and the like.

Some embodiments may be used in conjunction with Radio Frequency (RF) systems, radar systems, vehicular radar systems, detection systems, or the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

The term "communicating" as used herein with respect to a communication signal includes transmitting the communication signal and/or receiving the communication signal. For example, a communication unit, which is capable of communicating a communication signal, may include a transmitter to transmit the communication signal, and/or a communication receiver to receive the communication signal. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with an RF frequency in a frequency band having a starting frequency above 10 Gigahertz (GHz), for example, a frequency band having a starting frequency between 10 Ghz and 120 GHz. For example, some demonstrative embodiments may be used in conjunction with an RF frequency having a starting frequency above 30 Ghz, for example, above 45 GHz, e.g., above 60 GHz. For example, some demonstrative embodiments may be used in conjunction with an automotive radar frequency band, e.g., a frequency band between 76 GHz and 81 GHz. However, other embodiments may be implemented utilizing any other suitable frequency bands.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Some demonstrative embodiments are described herein with respect to RF radar signals. However, other embodiments may be implemented with respect to any other wireless signals, wireless communication signals, communication scheme, network, standard and/or protocol.

Reference is now made to FIG. 1, which schematically illustrates a block diagram of a system including a vehicle 100, in accordance with some demonstrative embodiments.

In some demonstrative embodiments, vehicle 100 may include a car, a truck, a motorcycle, a bus, or any other vehicle.

In some demonstrative embodiments, vehicle 100 may be configured to support and/or implement a vehicular system, for example, to be implemented and/or to be mounted in vehicle 100.

In some demonstrative embodiments, the vehicular system may include, for example, an autonomous vehicle system, an automated driving system, a driver assistance and/or support system, and/or the like.

In some demonstrative embodiments, vehicle 100 may include a radar 102. For example, radar 102 may include a radar detecting device, a radar sensing device, a radar sensor, or the like, e.g., as described below.

In some demonstrative embodiments, radar 102 may include a Multiple Input Multiple Output (MIMO) radar, e.g., as described below.

In other embodiments, radar 102 may include any other type of radar, e.g., as described below.

In some demonstrative embodiments, radar 102 may be configured to detect, and/or sense, one or more objects, which are located in a vicinity, e.g., a far vicinity and/or a near vicinity, of the vehicle 100, and to provide one or more parameters, attributes, and/or information with respect to the objects.

In some demonstrative embodiments, the objects may include other vehicles, pedestrians, traffic signs, traffic lights, roads, and/or the like.

In some demonstrative embodiments, the one or more parameters, attributes and/or information with respect to the object may include a range of the objects from the vehicle 100, an angle of the object with respect to the vehicle 100, a location of the object with respect to the vehicle 100, a relative speed of the object, and/or the like.

In some demonstrative embodiments, vehicle 100 may include a system controller 124 configured to control one or more functionalities, components, devices, systems and/or elements of vehicle 100.

In some demonstrative embodiments, system controller 124 may be configured to control one or more vehicular systems 118 of vehicle 100, e.g., as described below.

In some demonstrative embodiments, vehicular systems 118 may include, for example, a steering system, a braking system, a driving system, and/or any other system of the vehicle 100.

In some demonstrative embodiments, system controller 124 may configured to control radar 102, and/or to process one or parameters, attributes and/or information from radar 102.

In some demonstrative embodiments, system controller 124 may be configured, for example, to control the vehicular systems 118 of the vehicle, for example, based on radar information from radar 102 and/or one or more other sensors of the vehicle, e.g., Light Detection and Ranging (LIDAR) sensors, camera sensors, and/or the like.

In one example, system controller 124 may control the steering system, the braking system, and/or any other vehicular systems 118 of vehicle 100, for example, based on the information from radar 102, e.g., based on one or more objects detected by radar 102.

In other embodiments, system controller 124 may be configured to control any other additional or alternative functionalities of vehicle 100.

In some demonstrative embodiments, vehicle 100 may include, for example, one or more of a processor 191, an input unit 192, an output unit 193, a memory unit 194, and/or a storage unit 195. Vehicle 100 may optionally include other suitable hardware components and/or software components. In some demonstrative embodiments, some or all of the components of one or more of vehicle 100 may be enclosed in a common housing or packaging, and may be interconnected or operably associated using one or more wired or wireless links. In other embodiments, components of one or more of vehicle 100 may be distributed among multiple or separate devices.

In some demonstrative embodiments, processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS), e.g., a vehicular operating system, of vehicle 100 and/or of one or more suitable applications.

In some demonstrative embodiments, input unit 192 may include, for example, a touch-screen, a touch-pad, a trackball, a stylus, a microphone, or other suitable pointing device or input device. Output unit 193 includes, for example, a monitor, a screen, a touch-screen, a flat panel display, a Light Emitting Diode (LED) display unit, a Liquid Crystal Display (LCD) display unit, one or more audio speakers or earphones, or other suitable output devices.

In some demonstrative embodiments, memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195, for example, a hard disk drive, a Solid State Drive (SSD), a floppy disk drive, a Compact Disk (CD) drive, a CD-ROM drive, a DVD drive, or other suitable removable or non-removable storage units. Memory unit 194 and/or storage unit 195, for example, may store data processed by vehicle 100.

In some demonstrative embodiments, radar 102 may include a radar processor 134 configured to process radar information of radar 102 and/or to control one or more operations of radar 102, e.g., as described below.

In some demonstrative embodiments, radar processor 134 may include, or may be implemented, partially or entirely, by circuitry and/or logic, e.g., one or more processors including circuitry and/or logic, memory circuitry and/or logic. Additionally or alternatively, one or more functionalities of radar processor 134 may be implemented by logic, which may be executed by a machine and/or one or more processors, e.g., as described below.

In one example, radar processor 134 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In other embodiments, radar processor 134 may be implemented by one or more additional or alternative elements of vehicle 100.

In some demonstrative embodiments, at least part of the functionality of radar processor 134 may be implemented as part of system controller 124.

In other embodiments, the functionality of radar processor 134 may be implemented as part of any other element of radar 102 and/or vehicle 100.

In other embodiments, radar processor 134 may be implemented, as a separate part of, or as part of any other element of radar 102 and/or vehicle 100.

In some demonstrative embodiments, radar 102 may include a transmitter (Tx) 116 including circuitry and/or logic configured to generate and/or transmit Tx radar signals.

In some demonstrative embodiments, radar 102 may include a receiver (Rx) 118 including circuitry and/or logic to receive and/or process Rx radar signals, for example, based on the Tx radar signals.

In some demonstrative embodiments, transmitter 116, and/or receiver 118 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like.

In some demonstrative embodiments, radar 102 may include a radar antenna 115, e.g., as described below.

In some demonstrative embodiments, transmitter 116, and/or receiver 118 may include, or may be associated with, radar antenna 115.

In some demonstrative embodiments, radar antenna 115 may include at least one Tx antenna 107 configured to transmit a Tx radar signal, e.g., as described below.

In some demonstrative embodiments, radar antenna 115 may include a plurality of Receive (Rx) antennas 109 configured to receive Rx radar signals, for example, based on the Tx radar signal, e.g., as described below.

In some demonstrative embodiments, radar antenna 115 may include a Multiple-Input-Multiple-Output (MIMO) radar antenna including a plurality of Tx antennas 107, e.g., as described below.

In other embodiments, radar antenna 115 may include a single Tx antenna 107, e.g., as described below In some demonstrative embodiments, radar processor 134 may be configured to detect one or more targets and/or to estimate an angle of the one or more targets, for example, based on the Rx radar signals, e.g., as described below.

In one example, antennas 107 and/or 109 may include or may be part of any type of antennas suitable for transmitting and/or receiving radar signals. For example, antennas 107 and/or 109 may be implemented as part of any suitable configuration, structure, and/or arrangement of one or more antenna elements, components, units, assemblies, and/or arrays. For example, antennas 107 and/or 109 may be implemented as part of a phased array antenna, a multiple element antenna, a set of switched beam antennas, and/or the like. In some embodiments, antennas 107 and/or 109 may be implemented to support transmit and receive functionalities using separate transmit and receive antenna elements. In some embodiments, antennas 107 and/or 109 may be implemented to support transmit and receive functionalities using common and/or integrated transmit/receive elements.

In some demonstrative embodiments, it may be advantageous to increase an angular resolution of radar antenna 115, for example, for Autonomous Vehicle (AV) radars working in the 76-81 GHz band, or any other radar system. For example, the angular resolution of radar antenna 115 may allow radar 102 and/or radar processor 134 to separate between two closely spaced targets, for example, a motorcycle parked under a bridge, two distant vehicles in different lanes, and/or the like.

In some demonstrative embodiments, an angular resolution of a radar system may be proportional to an aperture size of the antenna array.

In some demonstrative embodiments, the angular resolution of an antenna array may be increased, for example, by increasing an aperture size of the antenna array, e.g., as described below.

In some demonstrative embodiments, a maximum distance between each two adjacent antennas of an antenna array may be required to remain smaller than half of a wavelength of the radar signal used, for example, in order to avoid ambiguities in an estimated angle. Accordingly, an increased number of antennas may be required to provide an increased aperture size while avoiding ambiguities.

In some demonstrative embodiments, there may be one or more technical inefficiencies, disadvantages and/or problems in one or more use cases and/or scenarios, to utilize larger antenna arrays or larger MIMO radars, e.g., including a large number of antennas to provide a larger aperture size, for example, to provide the increased angular resolution of the antenna array.

In some demonstrative embodiments, an antenna array having a large number of antennas, e.g., Tx antennas and/or Rx antennas, may incur additional costs, e.g., as described below.

In one example, the large number of antennas may require a large number of respective Rx and/or Tx processing chains, which may increase the cost of a radar system.

In another example, the large number of antennas may require a higher level of calibration, for example, due to physical differences between the Rx and/or Tx antennas.

In some demonstrative embodiments, there may be one or more technical inefficiencies, disadvantages and/or problems in one or more use cases and/or scenarios, to use larger antenna arrays, or larger MIMO radars, for example, using a narrow band approach, e.g., utilizing a narrow-band radar signal. For example, larger antenna arrays using the narrow band approach may not be suitable and/or efficient for vehicular radar systems.

In some demonstrative embodiments, one or more properties of a Uniform Linear Array (ULA) may be implemented, for example, to increase an angular resolution of an antenna array, e.g., as described below.

Some demonstrative embodiments are described below with respect to an antenna array utilizing properties of a ULA. In other embodiments, the antenna array may be non-uniform and/or may implement any other properties of any other antenna scheme.

Figure 2:
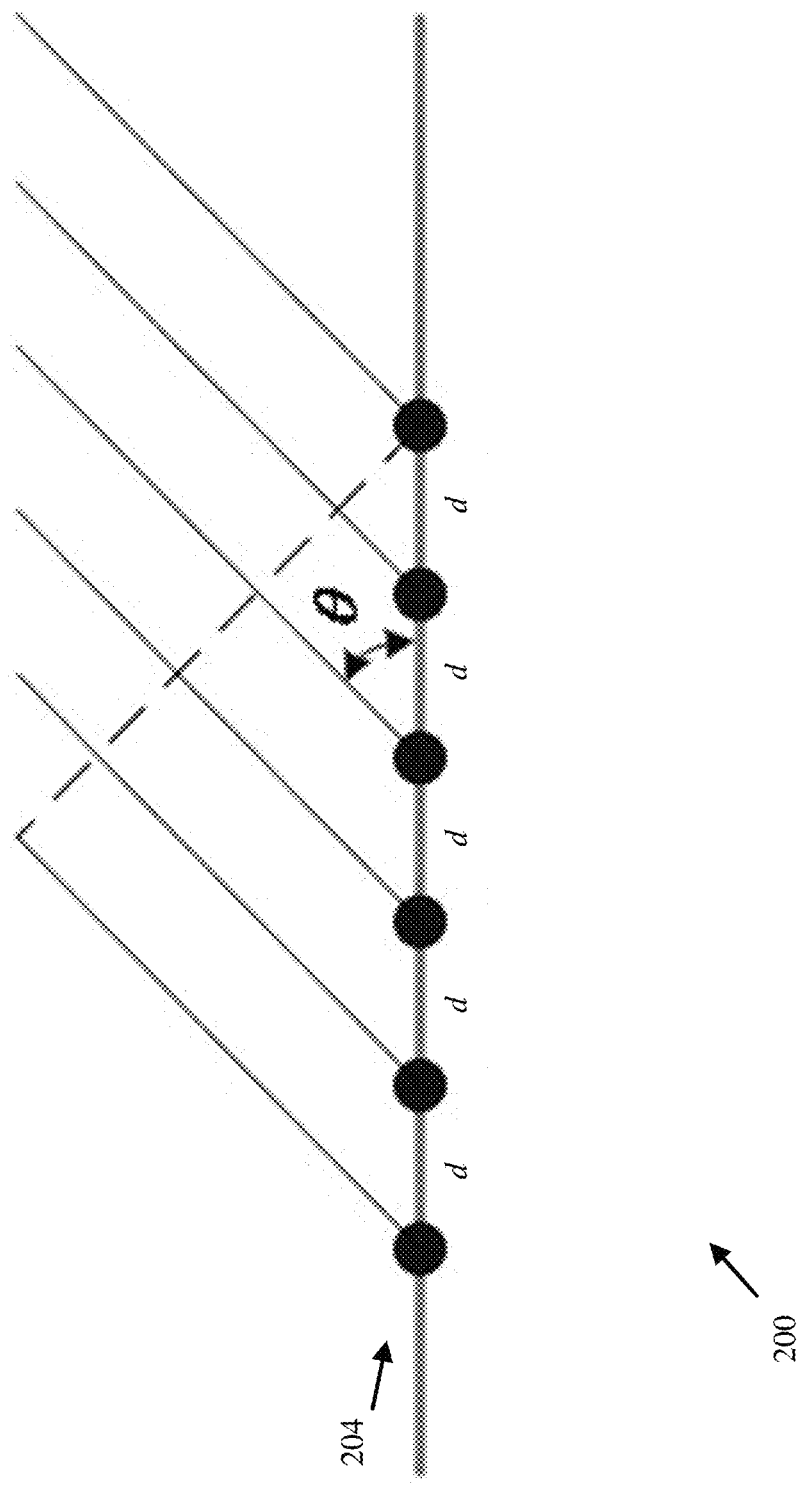
FIG. 2 is a schematic illustration of a uniform linear array (ULA) scheme to illustrate one or more properties, which may be implemented in accordance with some demonstrative embodiments.

Reference is made to FIG. 2, which schematically illustrates a ULA scheme 200 to illustrate one or more properties, which may be implemented in accordance with some demonstrative embodiments.

In one example, a ULA may be formed, for example, by spacing antennas of the ULA at half-wavelength distance from one another along a line and/or axis, e.g., as described below.

As shown in FIG. 2, ULA 200 may include a plurality of antennas 204 along a line.

As shown in FIG. 2, the plurality of antennas 204 may be spaced by a distance, denoted d, from each other. For example, the distance d may be a half-wavelength distance, which may be equal to half of a wavelength of the radar signal communicated via ULA 200.

As shown in FIG. 2, a radar angle estimation may rely on a total phase offset caused by a propagation of a signal from a target to each one of the antennas 204. For example, the target may be assumed to be far away from ULA 200.

In one example, a vector, denoted $\Delta r_k$, may be defined as a vector from a position of a reference antenna, e.g., a predetermined antenna 204 of ULA 200, to a position of another antenna 204 numbered k According to this example, a phase offset measured at the antenna k may be determined, e.g., as follows:

$$\exp\left(2\pi j \overrightarrow{\Delta r_k} \cdot \frac{\hat{r}_{tar}}{\lambda}\right) \quad (1)$$

wherein $\hat{r}_{tar}$ denotes a unit vector pointing from the reference antenna k to a position of the target, and $\lambda$ denotes a wavelength of the radar signal communicated by ULA 200.

In one example, the phase offset measured at the antenna k may be determined, for example, when ULA 200 includes a 2-dimensional ULA (2D-ULA), e.g., as follows:

$$\exp\left(\frac{2\pi j d}{\lambda}\cos(\theta)\right) \quad (2)$$

wherein d denotes a distance between each two antennas of ULA 200 and $\theta$ denotes an angle to the target.

In one example, a Bandwidth (BW) of the radar signal communicated via ULA 200 may be assumed to be small relative to a center frequency of the radar signal, e.g., according to a narrow band assumption. For example, a possible range of the wavelength $\lambda$ of the radar signal may be very small around the central frequency of the radar signal, and the distance d may be determined as $\lambda/2$, which may also be very small.

Referring back to FIG. 1, in some demonstrative embodiments, radar 102 and/or radar antenna 115 may be configured to provide an increase angular resolution of radar antenna 115, for example, even without using a large number of antennas, e.g., as described below.

In some demonstrative embodiments, radar 102 be configured to provide increased angular resolution of radar antenna 115, for example, suitable for implementation in high resolution vehicular radars, which may operate in the 77 GHz-81 GHz frequency band, with a large Bandwidth (BW), e.g., as described below. In other embodiments, radar 102 and/or radar antenna 115 may be implemented for any other type of system and/or any other frequency band may be utilized.

In some demonstrative embodiments, radar antenna 115 may be configured to utilize a large distance between antennas of radar antenna 115, e.g., a significantly larger distance compared to a typical distance, e.g., less than half a wavelength, as may be employed by conventional radar antennas, e.g., as described below.

In some demonstrative embodiments, radar 102 may be configured to utilize radar antenna 115, for example, for transmitting radar signals over a relatively large BW, for example, to support efficient and/or improved utilization of the large distance between the antennas of radar antenna 115, e.g., as described below.

In some demonstrative embodiments, radar 102 and/or radar antenna 115 may be configured to transmit the radar signals over the large BW, for example, in order to enhance the angular resolution, for example, instead of increasing the number of antennas.

In one example, different frequency tones of a radar signal may create different relative phases between the antennas of radar antenna 115.

In some demonstrative embodiments, configuring radar 102 and/or antenna array 115 to communicate radar signals with a wide BW may support utilizing a larger number of different relative phases between the antennas of radar antenna 115. This configuration may provide a technical advantage of providing a large virtual array, which may represent a large number of a total of actual and virtual antennas, for example, compared to an actual number of antennas in radar antenna 115, e.g., as described below.

In some demonstrative embodiments, radar antenna 115 may be configured to support improved accuracy and/or reliability of radar 102, and/or to support usage of a large bandwidth, e.g., to improve the angular resolution of the radar 102, for example, while supporting a reduced cost, and/or a reduced level of calibration. For example, using a large BW for the radar signals may be inexpensive and/or simple, for example, compared to a large aperture size antenna including an increased number of Rx and/or Tx antennas.

In some demonstrative embodiments, transmitter 116 may be configured to transmit via Tx antenna 107 a Tx radar signal, which may be configured to support, for example, an increased angular resolution, e.g., as described below.

In some demonstrative embodiments, the Tx radar signal may be in a frequency band between 77 Gigahertz (GHz) and 81 GHz, e.g., as described below.

In other embodiments, the Tx signal may be communicated over any other frequency band.

In some demonstrative embodiments, radar antenna 115 may include the plurality of Rx antennas 109 to receive the Rx radar signals based on the Tx radar signal, e.g., as described below.

In some demonstrative embodiments, a distance between a first Rx antenna of the planarity of Rx antennas 109 and a second Rx antenna of the plurality of Rx antennas 109, which may be adjacent to the first Rx antenna, may be at least ten times a wavelength of a central frequency of the Tx radar signal, e.g., as described below.

In some demonstrative embodiments, the distance between the first Rx antenna and the second Rx antenna of Rx antennas 109 may be at least twenty times the wavelength of the central frequency of the Tx radar signal, e.g., as described below.

In some demonstrative embodiments, the distance between the first Rx antenna and the second Rx antenna of Rx antennas 109 may be at least one hundred times the wavelength of the central frequency of the Tx radar signal, e.g., as described below.

In other embodiments, any other distance may be implemented between the first Rx antenna and the second Rx antenna.

In some demonstrative embodiments, one or more other pairs of adjacent Rx antennas of the Rx 109 may be spaced by any other distance.

In one example, each pair of adjacent Rx antennas may be spaced by a distance of at least ten times the wavelength of the central frequency of the Tx radar signal.

In another example, one pair of adjacent Rx antennas may be spaced by a distance of at least ten times the wavelength of the central frequency of the Tx radar signal, while another pair of adjacent Rx antennas may be spaced by a distance of less than ten times a wavelength of a central frequency of the Tx radar signal. For example, the other pair of adjacent Rx antennas may be spaced by a distance equal to or less than half of the wavelength of the central frequency of the Tx radar signal.

In some demonstrative embodiments, transmitter 116 may be configured to cause the Tx antenna 107 to transmit the Tx radar signal over a signal BW, which may be at least one percent of the central frequency of the Tx radar signal, e.g., as described below.

In some demonstrative embodiments, transmitter 116 may be configured to cause the Tx antenna 107 to transmit the Tx radar signal over a signal BW, which may be at least two percent of the central frequency of the Tx radar signal, e.g., as described below.

In some demonstrative embodiments, transmitter 116 may be configured to cause the Tx antenna 107 to transmit the Tx radar signal over a signal BW, which may be at least five percent of the central frequency of the Tx radar signal, e.g., as described below.

In some demonstrative embodiments, the signal BW may be at least 1 GHz, e.g., as described below.

In some demonstrative embodiments, the signal BW may be at least 5 GHz, e.g., as described below.

In some demonstrative embodiments, transmitter 116 may be configured to cause the Tx antenna 107 to transmit the Tx radar signal over any other signal BW.

In some demonstrative embodiments, transmitter 116 may be configured to cause the Tx antenna 107 to transmit the Tx radar signal over a plurality of subcarriers, e.g., as described below.

In some demonstrative embodiments, a subcarrier of the plurality of subcarriers may have a wavelength, which may be based on a count of the plurality of subcarriers and on the wavelength of the central frequency of the Tx radar signal, e.g., as described below.

In some demonstrative embodiments, the plurality of subcarriers may include N subcarriers, e.g., as described below.

In some demonstrative embodiments, a wavelength, denoted $\lambda k$, of a k-th subcarrier of the plurality of N subcarriers may be defined, e.g., as follows:

$$\lambda k = N/(k+N)*\lambda c, \tag{3}$$

wherein k=1 ... N, and wherein $\lambda c$ denotes the wavelength of the central frequency of the Tx radar signal, e.g., as described below.

In some demonstrative embodiments, a distance between the first Rx antenna and a third Rx antenna of the plurality of Rx antennas 109 may be based on a minimal wavelength, a maximal wavelength, and/or a distance between the second Rx antenna and the third Rx antenna, e.g., as described below.

In some demonstrative embodiments, the minimal wavelength may correspond to a lowest subcarrier of the plurality of subcarriers, and the maximal wavelength may correspond to a highest subcarrier of the plurality of subcarriers, e.g., as described below.

In some demonstrative embodiments, radar processor 134 may be configured to estimate an angle of a target based on the Rx radar signals, e.g., as described below.

In some demonstrative embodiments, radar processor 134 may be configured to process the Rx radar signals as Rx radar signals of a virtual ULA antenna including a plurality of virtual antennas, e.g., as described below.

In some demonstrative embodiments, a count of the plurality of virtual antennas may be greater than a count of actual Rx antennas in the plurality of Rx antennas 109, e.g., as described below.

In some demonstrative embodiments, the count of the plurality of virtual antennas may be at least 2 times the count of actual Rx antennas in the plurality of Rx antennas 109, e.g., as described below.

In some demonstrative embodiments, the count of the plurality of virtual antennas may be at least 10 times the count of the plurality of Rx antennas 109, e.g., as described below.

In other embodiments, any other count of the plurality of virtual antennas may be utilized.

In some demonstrative embodiments, the count of the plurality of virtual antennas of the ULA may be based, for example, on a count of the plurality of subcarriers in the plurality of the subcarriers utilized for the Tx radar signal, e.g., as described below.

In some demonstrative embodiments, a pair of adjacent virtual antennas, e.g., even each pair of adjacent virtual antennas, of the virtual ULA may be spaced by no more than half of the wavelength of the central frequency of the Tx radar signal, e.g., as described below.

In one example, radar antenna 115 may utilize a relatively large physical distance, denoted D, between a pair of adjacent Rx antennas of antennas array 115.

In some demonstrative embodiments, the distance D may be significantly greater than a wavelength, denoted λ, of the Tx radar signal to be communicated via antenna array 115, e.g., D>>λ.

In some demonstrative embodiments, transmitter 116 may be configured to cause the Tx antenna 107 to transmit the Tx radar signal over a large BW, e.g., defined by a large distance between a lowest subcarrier and a highest sub-carrier of the Tx radar signal. According to this example, the wavelength λ of the Tx radar signal may vary by more than 1%, e.g., according to the large BW.

In one example, radar antenna 115 may include a Tx antenna at a position [0,0] and at least two Rx antennas, e.g., including an Rx antenna at position [0,0], and/or a second Rx antenna at a position [D,0].

In some demonstrative embodiments, the Tx radar signal, when transmitted towards a target, may accumulate a total phase, for example, in relation to the axis center, e.g., as follows:

$$\exp\left(\frac{2\pi jR}{\lambda}\right) \quad (4)$$

wherein R denotes an unknown range from the axis center to the target.

In some demonstrative embodiments, the radar signal may receive an extra random phase, denoted exp (jϕ), for example, when scattered from the target.

In some demonstrative embodiments, the scattered radar signal, when travelling back to antenna array 115, may accumulate an additional phase for the first and second Rx antennas, e.g., as follows:

$$\exp\left(\frac{2\pi jR}{\lambda}\right)\left[1, \exp\left(\frac{2\pi jD}{\lambda}\cos(\theta)\right)\right] \quad (5)$$

In some demonstrative embodiments, when transmitter 116 may be configured to transmit the Tx radar signal over a plurality of sub-carriers. Accordingly, a total received signal for a sub-carrier k may be determined, e.g., as follows:

$$\exp\left(\frac{4\pi jR}{\lambda_k} + j\phi_k\right)\left[1, \exp\left(\frac{2\pi jD}{\lambda_k}\cos(\theta)\right)\right] \quad (6)$$

In some demonstrative embodiments, the Rx radar signal from the first Rx antenna may be multiplied by the conjugate of the Rx radar signal from the second antenna, e.g., for each tone, for example, to provide:

$$\exp\left(\frac{2\pi jD}{\lambda_k}\cos(\theta)\right) \quad (7)$$

In some demonstrative embodiments, small changes in the wavelength $\lambda_k$ may cause large phase offsets, e.g., as the distance D is large, for example, similar to a phase offset created by a slight movement of the radar antenna.

In some demonstrative embodiments, the Rx radar signals from the Rx antennas 109 of antenna array 115 may be processed as Rx signals of a "virtual array", which may be created, for example, based on the received radar signals from different sub-carriers.

In some demonstrative embodiments, radar processor 134 may be configured estimate an angle of a target, for example, based on the Calculation 7, e.g., as described below.

In some demonstrative embodiments, radar processor 134 may perform one or more operations, for example, to estimate the angle of the target, for example, according to a Bartlett Beamformer method, e.g., as described below. In other embodiments, radar processor 134 may utilize any other additional or alternative operations and/or calculations to determine the angle of the target.

In some demonstrative embodiments, radar processor 134 may create a matrix of expected phase offsets, e.g., for each i-th Rx antenna, a tone, denoted k, and a hypothesized target angle, denoted θ, e.g., as follows:

$$\exp\left(-\frac{2\pi jD_i}{\lambda_{i,k}}\cos(\theta)\right) \quad (8)$$

In some demonstrative embodiments, radar processor 134 may multiply the matrix of the expected phase offsets with the Rx radar signal received via the i-th Rx antenna.

In some demonstrative embodiments, the Rx radar signal from the target at the angle θ may be the same in all of the Rx antennas, for example, if the hypothesized target angle θ is correct.

In some demonstrative embodiments, radar processor 134 may multiply the Rx radar signal, e.g., at each tone from each Rx antenna, for example, by a conjugate of the same tone at a reference antenna, e.g., which may be located at the axis center. Any other reference antenna may be defined at any other location.

In some demonstrative embodiments, radar processor 134 may determine an average over all the tones and Rx antennas, for example, to define a beamforming spectrum, which may be used to estimate the angle of the target.

In other embodiments, radar processor 134 may estimate the angle of the target, for example, based on any other additional or alternative method.

In one example, first and second targets may be present, for example, at respective angles $\theta_1$, $\theta_2$, and at respective ranges $R_1$, $R_2$, For example, a received radar signal may be a superposition from both targets. According to this example, a signal from the second target may have a different phase at each Rx antenna, for example, when performing the Bartlett Beamformer method for the first target. For example, by taking an average over all the tones and antennas, the signal from the first target may be summed coherently, for example, while the signal from the second target may have an average having a smaller amplitude, e.g., compared to the amplitude of the signal from the first target. Accordingly, radar processor 134 may be able to separate between the two targets, e.g., based on the different amplitudes.

In some demonstrative embodiments, radar processor 134 may be configured to cause, trigger, and/or instruct transmitter 116 to transmit the Tx radar signal over a plurality of subcarriers, for example, using frequency hopping, e.g., as described below.

In one example, it may not be necessary to transmit the Tx radar signal over a large BW, for example, in order to increase the angular resolution of a radar antenna. For example, frequency hopping may be a simple way to increase the angular resolution of a radar design. For example, increasing the angular resolution using frequency hopping may be feasible, e.g., since coherency between different frequencies may not need to be assumed.

In some demonstrative embodiments, radar processor 134 may be configured to configure and/or select subcarrier frequencies, for example, to create a virtual ULA equivalent to a ULA with λ/2 spacing between 2 adjacent antennas of the ULA. In other embodiments, any other subcarrier frequencies may be utilized and/or any other type of virtual array may be utilized.

In some demonstrative embodiments, a phase offset, e.g., with respect to a reference antenna located at a position "0", may be configured to advance, for example, by no more than π, between the virtual antennas, e.g., as may be represented by sub-carriers of the radar signal.

In some demonstrative embodiments, the distance D between two adjacent antennas may be defined, e.g., as follows:

$$D = N\lambda_{center}/2 \tag{9}$$

wherein $\lambda_{center}$ denotes a wavelength of the central frequency of the Tx radar signal.

In some demonstrative embodiments, a requirement for tone k of the Tx radar signal may be defined, e.g., as follows:

$$\frac{N\lambda_{center}}{\lambda_k}\pi = \pi k + \pi N \tag{10}$$

or $$\frac{N}{k+N}\lambda_{center} = \lambda_k$$

In some demonstrative embodiments, the virtual array may be configured as a ULA with a plurality of antennas and an equivalent wavelength of $\lambda_{center}$, and the number of the plurality of virtual antennas may be as many as the number of tones.

In some demonstrative embodiments, a maximal count of the plurality of virtual antennas, which are spaced apart by $\lambda_{center}/2$ may be based on the signal BW, e.g., as follows:

$$2\frac{BW}{c}D \tag{11}$$

wherein c denotes the speed of light.

In some demonstrative embodiments, radar antenna 115 may include a plurality of Rx antennas, for example, where a first Rx antenna may be located at [0,0] and an i-th antenna of a plurality of other antennas may be located at [Di, 0].

In some demonstrative embodiments, the plurality of Rx antennas may be placed, for example, to ensure a virtual array having a spacing of at most $\lambda_{center}/2$, e.g., as follows:

$$D_i = \lambda_{min} \cdot \left(\frac{D_{i+1}}{\lambda_{max}} - 0.5\right) \tag{12}$$

wherein, $\lambda_{min}$ denotes the lowest wavelength, and $\lambda_{max}$ denotes the highest wavelength.

In one example, a phase offset between a first virtual antenna, created from a physical antenna i at a tone with the lowest wavelength, to a second virtual antenna i+1 created from a physical antennae at the tone with the highest wavelength, may be at most π, which may be required to represent a ULA without ambiguities.

In some demonstrative embodiments, radar antenna 115 may include a MIMO radar antenna including a plurality of Tx antennas 107 and a plurality of Rx antennas 109.

In some demonstrative embodiments, the increased angular resolution radar antenna may be implemented for a plurality of Tx antennas in a MIMO radar antenna, e.g., based on the above description with respect to the Rx antennas. This implementation may effectively multiply a total size of a virtual array created by the MIMO radar antenna.

In some demonstrative embodiments, the configuration of the distance between the adjacent Rx antennas of radar antenna 115 and/or the configuration of the BW of the Tx radar signal, e.g., as described above, may provide a technical advantage to increase, e.g., multiply, an effective angular resolution, for example, even without adding more antennas and/or creating angle ambiguities, e.g., as described above.

In some demonstrative embodiments, performance of radar 102 may scale linearly, for example, as increasing a range of the BW and/or the distance D between a pair of first and second adjacent antennas of radar antenna 115.

In one example, an effective size of an antenna array, e.g., radar antenna 115, may be multiplied by a factor of two or more, for example, based on the BW of the Tx radar signal and the distance D, e.g., as follows:

$$2\frac{BW}{c}D \cong \text{Factor} \tag{13}$$

For example, for a BW of 5 GHz and a distance D of 1 Meter (m), the effective size of the antenna array may be multiplied by a factor, which may be greater than 30, e.g., $$2\frac{BW}{c}D \cong 33.3.$$

Figure 3:
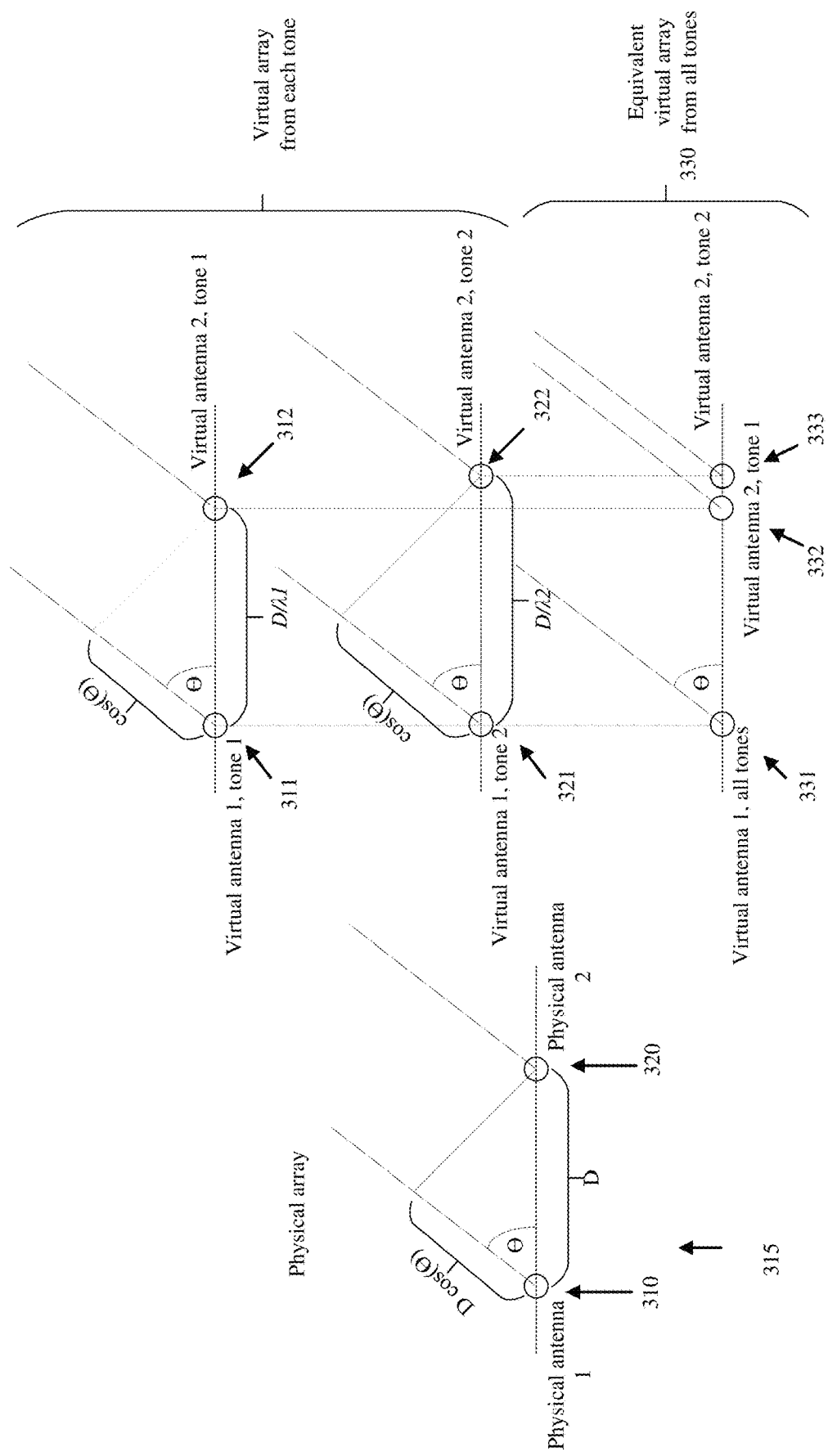
FIG. 3 is a schematic illustration of a virtual antenna array scheme, in accordance with some demonstrative embodiments.

Reference is made to FIG. 3, which schematically illustrates a virtual array scheme 300 in accordance with some demonstrative embodiments. For example, virtual array scheme 300 may be implemented by processor 134 (FIG. 1) and/or radar antenna 115 (FIG. 1).

In some demonstrative embodiments, as shown in FIG. 3, a radar antenna 315 may include a first physical antenna 310 and a second physical antenna 320, which are spaced by the distance D.

In some demonstrative embodiments, as shown in FIG. 3, a first tone having a wavelength $\lambda_1$ may create a first virtual antenna 311 at a first location and a second virtual antenna 312 at a second location, which is spaced from the first location by $D/\lambda_1$.

In some demonstrative embodiments, as shown in FIG. 3, a second tone having a wavelength $\lambda_2$ may result in a first virtual antenna 321 at the first location and a second virtual antenna 322 at a third location, which is spaced from the first location by $D/\lambda_2$.

In some demonstrative embodiments, as shown in FIG. 3, the first and second tones may result in a virtual ULA array 330 including three antennas 331, 332 and 333, e.g., at the first second and third locations, respectively.

Figure 4:
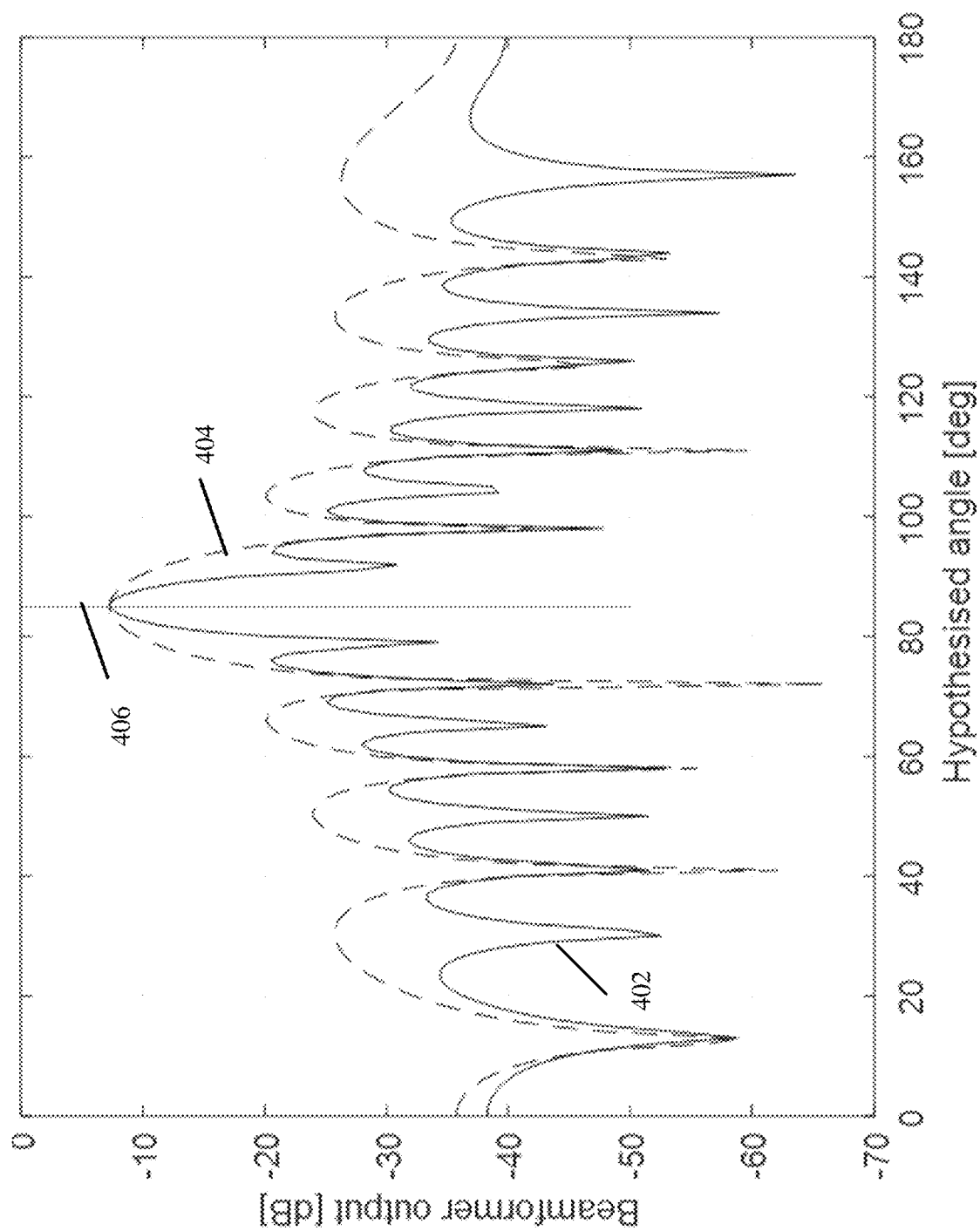
FIG. 4 is a schematic illustration of a graph depicting a comparison between beamforming patterns, in accordance with some demonstrative embodiments.

Reference is made to FIG. 4, which schematically illustrates a graph 400 depicting a comparison between a first beamforming pattern 402 and a second beamforming pattern 404, in accordance with some demonstrative embodiments.

In some demonstrative embodiments, beamforming pattern 402 represents values according to simulation results corresponding to an increased angular resolution radar antenna, e.g., radar antenna 115 (FIG. 1), and beamforming pattern 404 represents values according to simulation results corresponding to a physical ULA.

In some demonstrative embodiments, the increased angular resolution radar antenna may include ten Rx antennas, which may be modeled as isotropic radiators and may be placed along the X-axis at the antenna positions [0, 0.2697, 0.2733, 0.2770, 0.2807, 0.2844, 0.2883, 0.2921, 0.2960, 0.3000].

In some demonstrative embodiments, the increased angular resolution radar antenna may include a single Tx antenna, which may be located at an axis center.

In some demonstrative embodiments, a total physical size of the increased angular resolution radar antenna may be 30 centimeters.

In some demonstrative embodiments, a center frequency of a radar signal transmitted via the Tx antenna o the increased angular resolution radar antenna may be 79 GHz, and a total double-sided BW available of the radar signal may be 1 GHz.

In some demonstrative embodiments, the radar signal may include 21 sub-carriers with a frequency spacing of 50 MHz between each adjacent subcarriers.

In some demonstrative embodiments, the 21 subcarriers and the antenna positions may be determined, for example, to result in a virtual array, which is almost a ULA.

In some demonstrative embodiments, beamforming pattern 404 may simulate of an equivalent Single Carrier (SC) classical beamforming, e.g., a Bartlett Beamformer, of the physical ULA.

In some demonstrative embodiments, the physical ULA may include the same Tx antenna at the same location, and the same 10 Rx antennas, which may be located at the antenna positions [0, 0.5·$\lambda_{center}$, . . . , 4.5·$\lambda_{center}$].

In some demonstrative embodiments, the physical ULA may transmit the same radar signal having the same center frequency of the Tx radar signal and the same wavelength $\lambda_{center}$ of the Tx radar signal.

In some demonstrative embodiments, as shown in FIG. 4, a single point target 406 may be located at a range of 86.16 meters, and at an angle of 85 degrees with respect to the X axis, e.g., at a position of [7.51, 85.83].

In some demonstrative embodiments, as shown in FIG. 4, although both antennas have a same number of physical antennas, an effective size of the virtual array created by the increased angular resolution radar antenna, e.g., as shown by beamforming pattern 402, may be approximately twice as large as the physical ULA array, e.g., as shown by beamforming pattern 404.

In some demonstrative embodiments, the effective size of the virtual array created by the increased angular resolution radar antenna may increase by a factor of two the angular resolution of the physical ULA, for example, without adding more antennas or introducing ambiguities.

Figure 5:
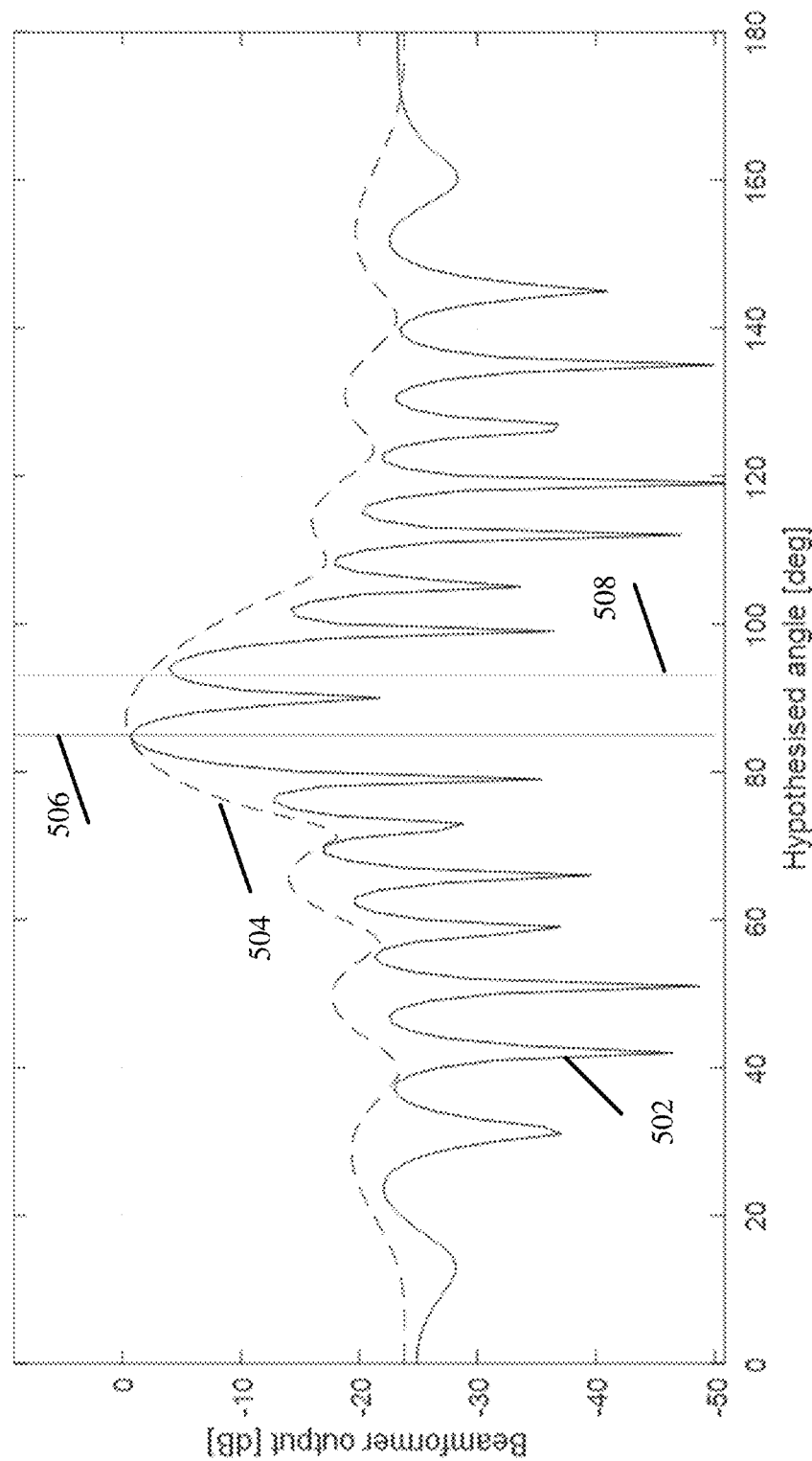
FIG. 5 is a schematic illustration of a graph depicting a comparison between beamforming, in accordance with some demonstrative embodiments.

Reference is made to FIG. 5, which schematically illustrates a graph 500 depicting a comparison between a first beamforming pattern 502 and a second beamforming pattern 504, in accordance with some demonstrative embodiments.

In some demonstrative embodiments, beamforming pattern 502 may represent simulation results of an increased angular resolution radar antenna, e.g., radar antenna 115 (FIG. 1), and beamforming pattern 504 may represent simulation results of a physical ULA.

In some demonstrative embodiments, the increased angular resolution radar antenna may include ten Rx antennas, which may be modeled as isotropic radiators and may be placed along the X-axis at the following antenna positions [0, 0.2697, 0.2733, 0.2770, 0.2807, 0.2844, 0.2883, 0.2921, 0.2960, 0.3000].

In some demonstrative embodiments, the increased angular resolution radar antenna may include a single Tx antenna, which may be located at an axis center.

In some demonstrative embodiments, a total physical size of the increased angular resolution radar antenna may be 30 centimeters.

In some demonstrative embodiments, a center frequency of a radar signal transmitted via the increased angular resolution radar antenna may be 79 GHz and a total double-sided BW available of the radar signal may be 1 GHz.

In some demonstrative embodiments, the radar signal may include 21 sub-carriers with a frequency spacing of 50 MHz between each adjacent subcarriers.

In some demonstrative embodiments, the 21 subcarriers and the antenna positions may be configured, for example, to result in a virtual antenna array, which is almost a ULA.

In some demonstrative embodiments, beamforming pattern 404 shows simulation of an equivalent SC classical beamforming, e.g., a Bartlett Beamformer, of the physical ULA.

In some demonstrative embodiments, the physical ULA may include the same Tx antenna at the same location and the same 10 Rx antennas at the antenna [0, 0.5·$\lambda_{center}$, . . . , 4.5·$\lambda_{center}$] positions.

In some demonstrative embodiments, the physical ULA may transmit the same radar signal having the same center frequency of the radar signal and the same wavelength $\lambda_{center}$ of the radar signal.

In some demonstrative embodiments, a first point target 506 may be located at a first range of 86.16 m and at a first angle of 85 degrees with respect to the X axis, e.g., at a position of [7.51, 85.83], and a second point target 508 may be located at a second range of 85.38 m and at a second angle of 93 degrees with respect to the X axis.

In one example, scattering from the first and second targets 506 and 508 may cause a random amplitude and phase offset by multiplying the signal by [−0.2390−0.9014i, 0.6150+0.3481i] for the two targets, respectively.

In some demonstrative embodiments, as shown in FIG. 5, beamforming pattern 502 may enable to separate between targets 506 and 508, for example, even if they are closely spaced, while separation of the two targets 506 and 508 may not be possible using radiation pattern 508, according to the SC method for the physical ULA.

As shown in FIG. 5, the increased angular resolution radar antenna may enable to detect both targets 506 and 508, for example, even if the increased angular resolution radar antenna utilizes a same number of physical antennas as the physical ULA.

Figure 6:
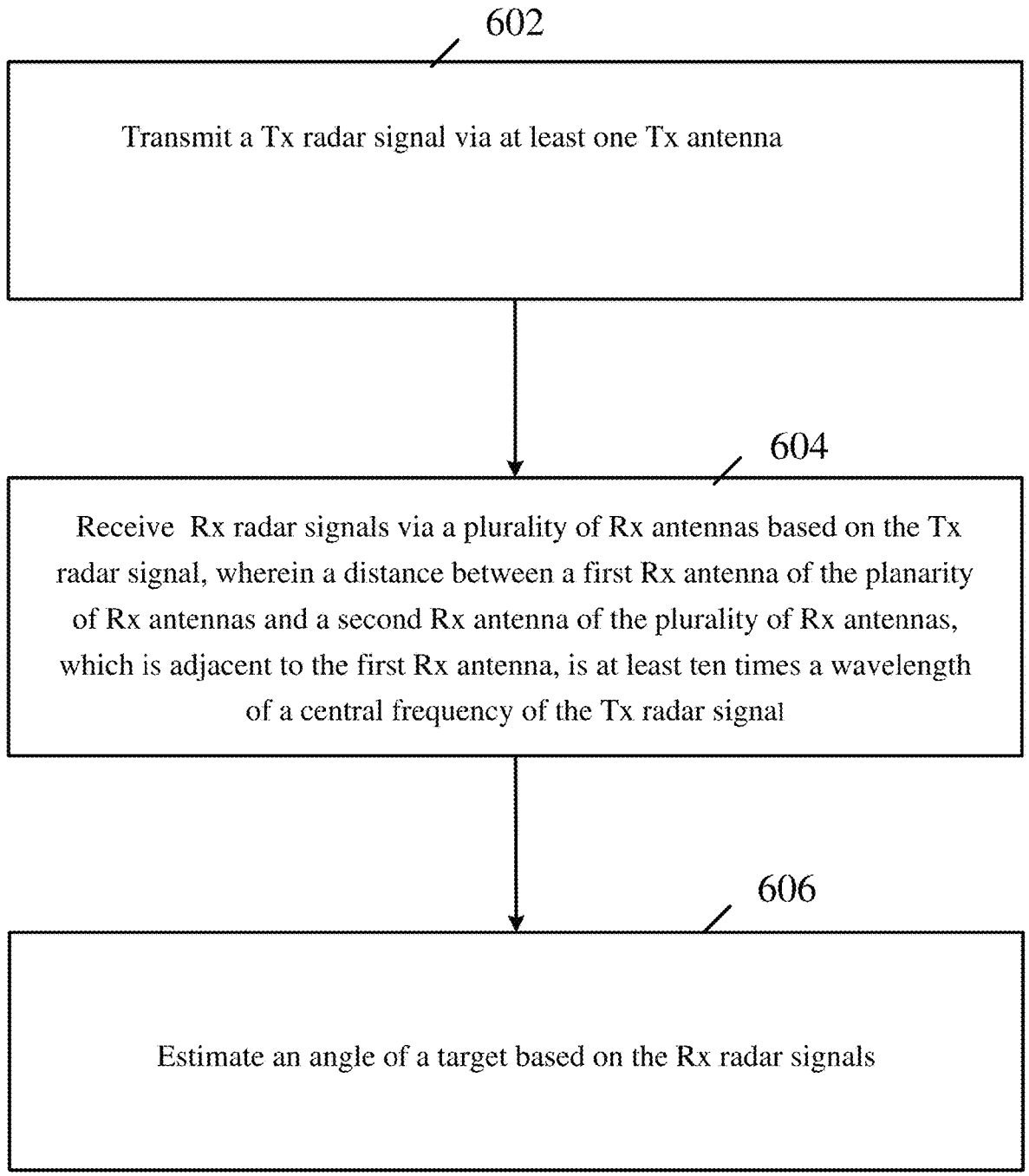
FIG. 6 is a schematic flow chart illustration of a method of communicating radar signals, in accordance with some demonstrative embodiments.

Reference is made to FIG. 6, which schematically illustrates a method of communicating radar signals, in accordance with some demonstrative embodiments. For example, one or more operations of the method of FIG. 6 may be performed by one or more elements of a vehicle, e.g., vehicle 100 (FIG. 1), and/or a radar, e.g., radar 102 (FIG. 1), and/or a radar processor, e.g., radar processor 134 (FIG. 1).

As indicated at block 602, the method may include transmitting a Tx radar signal via at least one Tx antenna. For example, radar processor 134 (FIG. 1) may control, cause and/or trigger radar antenna 115 (FIG. 1) to transmit the Tx radar signal via Tx antenna 107 (FIG. 1), e.g., as described above.

As indicated at block 604, the method may include receiving Rx radar signals via a plurality of Rx antennas based on the Tx radar signal, wherein a distance between a first Rx antenna of the planarity of Rx antennas and a second Rx antenna of the plurality of Rx antennas, which is adjacent to the first Rx antenna, is at least ten times a wavelength of a central frequency of the Tx radar signal. For example, radar processor 134 (FIG. 1) may control, cause and/or trigger radar antenna 115 (FIG. 1) to receive the Rx radar signals via the plurality of Rx antennas 109 (FIG. 1) based on the Tx radar signal 107 (FIG. 1), wherein the distance between the first Rx antenna of the planarity of Rx antennas 109 (FIG. 1) and the second Rx antenna of the plurality of Rx antennas 109 (FIG. 1), which is adjacent to the first Rx antenna, is at least ten times a wavelength of the central frequency of the Tx radar signal, e.g., as described above. e.g., as described above.

As indicated at block 606, the method may include estimating an angle of a target based on the Rx radar signals. For example, radar processor 134 (FIG. 1) may estimate the angle of the target based on the Rx radar signals, e.g., as described above.

Figure 7:
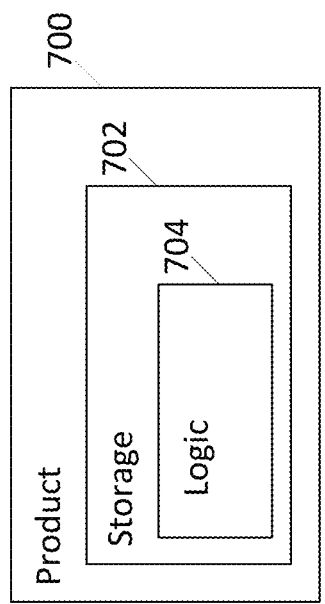
FIG. 7 is a schematic illustration of a product of manufacture, in accordance with some demonstrative embodiments.

Reference is made to FIG. 7, which schematically illustrates a product of manufacture 700, in accordance with some demonstrative embodiments. Product 700 may include one or more tangible computer-readable ("machine-readable") non-transitory storage media 702, which may include computer-executable instructions, e.g., implemented by logic 704, operable to, when executed by at least one computer processor, enable the at least one computer processor to implement one or more operations at vehicle 100 (FIG. 1), radar 102 (FIG. 1), and/or radar processor 134 (FIG. 1). Additionally or alternatively, non-transitory storage media 702 may include computer-executable instructions, e.g., implemented by logic 704, operable to, when executed by at least one computer processor, enable the at least one computer processor to cause vehicle 100 (FIG. 1), radar 102 (FIG. 1), and/or radar processor 134 (FIG. 1), to perform, trigger and/or implement one or more operations and/or functionalities, e.g., as described herein. Additionally or alternatively, non-transitory storage media 702 may include computer-executable instructions, e.g., implemented by logic 704, operable to, when executed by at least one computer processor, enable the at least one computer processor to perform, trigger and/or implement one or more operations and/or functionalities described with reference to the FIGS. 1, 2, 3, 4, 5, and/or 6, and/or one or more operations described herein. The phrases "non-transitory machine-readable medium" and "computer-readable non-transitory storage media" may be directed to include all computer-readable media, with the sole exception being a transitory propagating signal.

In some demonstrative embodiments, product 700 and/or machine-readable storage media 702 may include one or more types of computer-readable storage media capable of storing data, including volatile memory, non-volatile memory, removable or non-removable memory, erasable or non-erasable memory, writeable or re-writeable memory, and the like. For example, machine-readable storage media 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process, and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner, or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising a radar antenna, the radar antenna comprising at least one Transmit (Tx) antenna to transmit a Tx radar signal; and a plurality of Receive (Rx) antennas to receive Rx radar signals based on the Tx radar signal, wherein a distance between a first Rx antenna of the plurality of Rx antennas and a second Rx antenna of the plurality of Rx antennas, which is adjacent to the first Rx antenna, is at least ten times a wavelength of a central frequency of the Tx radar signal.

Example 2 includes the subject matter of Example 1, and optionally, comprising a transmitter configured to cause the Tx antenna to transmit the Tx radar signal over a signal Bandwidth (BW), which is at least one percent of the central frequency of the Tx radar signal.

Example 3 includes the subject matter of Example 2, and optionally, wherein the signal BW is at least two percent of the central frequency of the Tx radar signal.

Example 4 includes the subject matter of Example 2 or 3, and optionally, wherein the signal BW is at least five percent of the central frequency of the Tx radar signal.

Example 5 includes the subject matter of any one of Examples 2-4, and optionally, wherein the signal BW is at least 1 Gigahertz (GHz).

Example 6 includes the subject matter of any one of Examples 2-5, and optionally, wherein the signal BW is at least 5 Gigahertz (GHz).

Example 7 includes the subject matter of any one of Examples 1-6, and optionally, comprising a transmitter configured to cause the Tx antenna to transmit the Tx radar signal over a plurality of subcarriers, a subcarrier of the plurality of subcarriers having a wavelength, which is based on a count of the plurality of subcarriers and on the wavelength of the central frequency of the Tx radar signal.

Example 8 includes the subject matter of Example 7, and optionally, wherein the plurality of subcarriers comprises N subcarriers, a k-th subcarrier having a wavelength $\lambda k=N/(k+N)*\lambda c$, wherein $k=1 \ldots N$, and wherein $\lambda c$ is the wavelength of the central frequency of the Tx radar signal.

Example 9 includes the subject matter of Example 7 or 8, and optionally, wherein a distance between the first Rx antenna and a third Rx antenna of the plurality of Rx antennas is based on a minimal wavelength, a maximal wavelength, and a distance between the second Rx antenna and the third Rx antenna, the minimal wavelength corresponding to a lowest subcarrier of the plurality of subcarriers, the maximal wavelength corresponding to a highest subcarrier of the plurality of subcarriers.

Example 10 includes the subject matter of any one of Examples—19, and optionally, comprising a radar processor configured to estimate an angle of a target based on the Rx radar signals.

Example 11 includes the subject matter of Example 10, and optionally, wherein the radar processor is configured to process the Rx radar signals as Rx radar signals of a virtual Uniform Linear Array (ULA) antenna comprising a plurality of virtual antennas, wherein a count of the plurality of virtual antennas is greater than a count of the plurality Rx antennas.

Example 12 includes the subject matter of Example 11, and optionally, wherein each pair of adjacent virtual antennas of the virtual ULA is spaced by no more than half of the wavelength of the central frequency of the Tx radar signal.

Example 13 includes the subject matter of Example 11 or 12, and optionally, wherein the Tx signal comprises a plurality of subcarriers, and wherein the count of the plurality of virtual antennas is based on a count of the plurality of subcarriers.

Example 14 includes the subject matter of any one of Examples 11-13, and optionally, wherein the count of the plurality of virtual antennas is at least 2 times the count of the plurality of Rx antennas.

Example 15 includes the subject matter of any one of Examples 11-14, and optionally, wherein the count of the plurality of virtual antennas is at least 10 times the count of the plurality of Rx antennas.

Example 16 includes the subject matter of any one of Examples 1-15, and optionally, wherein the distance between the first Rx antenna and the second Rx antenna is at least twenty times the wavelength of the central frequency of the Tx radar signal.

Example 17 includes the subject matter of any one of Examples 1-16, and optionally, wherein the distance between the first Rx antenna and the second Rx antenna is at least one hundred times the wavelength of the central frequency of the Tx radar signal.

Example 18 includes the subject matter of any one of Examples 1-17, and optionally, wherein the Tx radar signal is in a frequency band between 77 Gigahertz (GHz) and 81 GHz.

Example 19 includes the subject matter of any one of Examples 1-18, and optionally, wherein the radar antenna comprises a Multiple-Input-Multiple-Output (MIMO) radar antenna comprising a plurality of Tx antennas.

Example 20 includes the subject matter of any one of Examples 1-19, and optionally, comprising a vehicle.

Example 21 includes a radar device comprising a radar antenna, the radar antenna comprising at least one Transmit (Tx) antenna to transmit a Tx radar signal; and a plurality of Receive (Rx) antennas to receive Rx radar signals based on the Tx radar signal, wherein a distance between a first Rx antenna of the plurality of Rx antennas and a second Rx antenna of the plurality of Rx antennas, which is adjacent to the first Rx antenna, is at least ten times a wavelength of a central frequency of the Tx radar signal; and a radar processor configured to estimate an angle of a target based on the Rx radar signals.

Example 22 includes the subject matter of Example 21, and optionally, comprising a transmitter configured to cause the Tx antenna to transmit the Tx radar signal over a signal Bandwidth (BW), which is at least one percent of the central frequency of the Tx radar signal.

Example 23 includes the subject matter of Example 22, and optionally, wherein the signal BW is at least two percent of the central frequency of the Tx radar signal.

Example 24 includes the subject matter of Example 22 or 23, and optionally, wherein the signal BW is at least five percent of the central frequency of the Tx radar signal.

Example 25 includes the subject matter of any one of Examples 22-24, and optionally, wherein the signal BW is at least 1 Gigahertz (GHz).

Example 26 includes the subject matter of any one of Examples 22-25, and optionally, wherein the signal BW is at least 5 Gigahertz (GHz).

Example 27 includes the subject matter of any one of Examples 21-26, and optionally, comprising a transmitter configured to cause the Tx antenna to transmit the Tx radar signal over a plurality of subcarriers, a subcarrier of the plurality of subcarriers having a wavelength, which is based on a count of the plurality of subcarriers and on the wavelength of the central frequency of the Tx radar signal.

Example 28 includes the subject matter of Example 27, and optionally, wherein the plurality of subcarriers comprises N subcarriers, a k-th subcarrier having a wavelength $\lambda k=N/(k+N)*\lambda c$, wherein $k=1 \ldots N$, and wherein $\lambda c$ is the wavelength of the central frequency of the Tx radar signal.

Example 29 includes the subject matter of Example 27 or 28, and optionally, wherein a distance between the first Rx antenna and a third Rx antenna of the plurality of Rx antennas is based on a minimal wavelength, a maximal wavelength, and a distance between the second Rx antenna and the third Rx antenna, the minimal wavelength corresponding to a lowest subcarrier of the plurality of subcarriers, the maximal wavelength corresponding to a highest subcarrier of the plurality of subcarriers.

Example 30 includes the subject matter of any one of Examples 21-29, and optionally, wherein the radar processor is configured to process the Rx radar signals as Rx radar signals of a virtual Uniform Linear Array (ULA) antenna comprising a plurality of virtual antennas, wherein a count of the plurality of virtual antennas is greater than a count of the plurality Rx antennas.

Example 31 includes the subject matter of Example 30, and optionally, wherein each pair of adjacent virtual antennas of the virtual ULA is spaced by no more than half of the wavelength of the central frequency of the Tx radar signal.

Example 32 includes the subject matter of Example 30 or 31, and optionally, wherein the Tx signal comprises a plurality of subcarriers, and wherein the count of the plurality of virtual antennas is based on a count of the plurality of subcarriers.

Example 33 includes the subject matter of any one of Examples 30-32, and optionally, wherein the count of the plurality of virtual antennas is at least 2 times the count of the plurality of Rx antennas.

Example 34 includes the subject matter of any one of Examples 30-33, and optionally, wherein the count of the plurality of virtual antennas is at least 10 times the count of the plurality of Rx antennas.

Example 35 includes the subject matter of any one of Examples 21-34, and optionally, wherein the distance between the first Rx antenna and the second Rx antenna is at least twenty times the wavelength of the central frequency of the Tx radar signal.

Example 36 includes the subject matter of any one of Examples 21-35, and optionally, wherein the distance between the first Rx antenna and the second Rx antenna is at least one hundred times the wavelength of the central frequency of the Tx radar signal.

Example 37 includes the subject matter of any one of Examples 21-36, and optionally, wherein the Tx radar signal is in a frequency band between 77 Gigahertz (GHz) and 81 GHz.

Example 38 includes the subject matter of any one of Examples 21-37, and optionally, wherein the radar antenna comprises a Multiple-Input-Multiple-Output (MIMO) radar antenna comprising a plurality of Tx antennas.

Example 39 includes the subject matter of any one of Examples 21-38, and optionally, comprising a vehicle.

Example 40 includes a vehicle comprising a system controller configured to control one or more vehicular systems of the vehicle based on radar information; and a radar device configured to provide the radar information to the system controller, the radar device comprising a radar antenna, the radar antenna comprising at least one Transmit (Tx) antenna to transmit a Tx radar signal; and a plurality of Receive (Rx) antennas to receive Rx radar signals based on the Tx radar signal, wherein a distance between a first Rx antenna of the plurality of Rx antennas and a second Rx antenna of the plurality of Rx antennas, which is adjacent to the first Rx antenna, is at least ten times a wavelength of a central frequency of the Tx radar signal; and a radar processor configured to estimate the radar information based on the Rx radar signals.

Example 41 includes the subject matter of Example 40, and optionally, wherein the radar device comprises a transmitter configured to cause the Tx antenna to transmit the Tx radar signal over a signal Bandwidth (BW), which is at least one percent of the central frequency of the Tx radar signal.

Example 42 includes the subject matter of Example 41, and optionally, wherein the signal BW is at least two percent of the central frequency of the Tx radar signal.

Example 43 includes the subject matter of Example 41 or 42, and optionally, wherein the signal BW is at least five percent of the central frequency of the Tx radar signal.

Example 44 includes the subject matter of any one of Examples 41-43, and optionally, wherein the signal BW is at least 1 Gigahertz (GHz).

Example 45 includes the subject matter of any one of Examples 41-44, and optionally, wherein the signal BW is at least 5 Gigahertz (GHz).

Example 46 includes the subject matter of any one of Examples 40-45, and optionally, wherein the radar device comprises a transmitter configured to cause the Tx antenna to transmit the Tx radar signal over a plurality of subcarriers, a subcarrier of the plurality of subcarriers having a wavelength, which is based on a count of the plurality of subcarriers and on the wavelength of the central frequency of the Tx radar signal.

Example 47 includes the subject matter of Example 46, and optionally, wherein the plurality of subcarriers comprises N subcarriers, a k-th subcarrier having a wavelength $\lambda k = N/(k+N) * \lambda c$, wherein $k = 1 \ldots N$, and wherein $\lambda c$ is the wavelength of the central frequency of the Tx radar signal.

Example 48 includes the subject matter of Example 46 or 47, and optionally, wherein a distance between the first Rx antenna and a third Rx antenna of the plurality of Rx antennas is based on a minimal wavelength, a maximal wavelength, and a distance between the second Rx antenna and the third Rx antenna, the minimal wavelength corresponding to a lowest subcarrier of the plurality of subcarriers, the maximal wavelength corresponding to a highest subcarrier of the plurality of subcarriers.

Example 49 includes the subject matter of any one of Examples 40-48, and optionally, wherein the radar processor is configured to process the Rx radar signals as Rx radar signals of a virtual Uniform Linear Array (ULA) antenna comprising a plurality of virtual antennas, wherein a count of the plurality of virtual antennas is greater than a count of the plurality Rx antennas.

Example 50 includes the subject matter of Example 49, and optionally, wherein each pair of adjacent virtual antennas of the virtual ULA is spaced by no more than half of the wavelength of the central frequency of the Tx radar signal.

Example 51 includes the subject matter of Example 49 or 50, and optionally, wherein the Tx signal comprises a plurality of subcarriers, and wherein the count of the plurality of virtual antennas is based on a count of the plurality of subcarriers.

Example 52 includes the subject matter of any one of Examples 49-51, and optionally, wherein the count of the plurality of virtual antennas is at least 2 times the count of the plurality of Rx antennas.

Example 53 includes the subject matter of any one of Examples 49-52, and optionally, wherein the count of the plurality of virtual antennas is at least 10 times the count of the plurality of Rx antennas.

Example 54 includes the subject matter of any one of Examples 40-53, and optionally, wherein the distance between the first Rx antenna and the second Rx antenna is at least twenty times the wavelength of the central frequency of the Tx radar signal.

Example 55 includes the subject matter of any one of Examples 40-54, and optionally, wherein the distance between the first Rx antenna and the second Rx antenna is at least one hundred times the wavelength of the central frequency of the Tx radar signal.

Example 56 includes the subject matter of any one of Examples 40-55, and optionally, wherein the Tx radar signal is in a frequency band between 77 Gigahertz (GHz) and 81 GHz.

Example 57 includes the subject matter of any one of Examples 40-56, and optionally, wherein the radar antenna comprises a Multiple-Input-Multiple-Output (MIMO) radar antenna comprising a plurality of Tx antennas.

Example 58 includes a method comprising transmitting a Tx radar signal via at least one Transmit (Tx) antenna of a radar antenna; receiving Rx radar signals via a plurality of Receive (Rx) antennas of the radar antenna based on the Tx radar signal, wherein a distance between a first Rx antenna of the plurality of Rx antennas and a second Rx antenna of the plurality of Rx antennas, which is adjacent to the first Rx antenna, is at least ten times a wavelength of a central frequency of the Tx radar signal; and estimating an angle of a target based on the Rx radar signals.

Example 59 includes the subject matter of Example 58, and optionally, comprising transmitting the Tx radar signal over a signal Bandwidth (BW), which is at least one percent of the central frequency of the Tx radar signal.

Example 60 includes the subject matter of Example 59, and optionally, wherein the signal BW is at least two percent of the central frequency of the Tx radar signal.

Example 61 includes the subject matter of Example 59 or 60, and optionally, wherein the signal BW is at least five percent of the central frequency of the Tx radar signal.

Example 62 includes the subject matter of any one of Examples 59-61, and optionally, wherein the signal BW is at least 1 Gigahertz (GHz).

Example 63 includes the subject matter of any one of Examples 59-62, and optionally, wherein the signal BW is at least 5 Gigahertz (GHz).

Example 64 includes the subject matter of any one of Examples 58-63, and optionally, comprising transmitting the Tx radar signal over a plurality of subcarriers, a subcarrier of the plurality of subcarriers having a wavelength, which is based on a count of the plurality of subcarriers and on the wavelength of the central frequency of the Tx radar signal.

Example 65 includes the subject matter of Example 64, and optionally, wherein the plurality of subcarriers comprises N subcarriers, a k-th subcarrier having a wavelength $\lambda k = N/(k+N)*\lambda c$, wherein $k = 1 \ldots N$, and wherein $\lambda c$ is the wavelength of the central frequency of the Tx radar signal.

Example 66 includes the subject matter of Example 64 or 65, and optionally, wherein a distance between the first Rx antenna and a third Rx antenna of the plurality of Rx antennas is based on a minimal wavelength, a maximal wavelength, and a distance between the second Rx antenna and the third Rx antenna, the minimal wavelength corresponding to a lowest subcarrier of the plurality of subcarriers, the maximal wavelength corresponding to a highest subcarrier of the plurality of subcarriers.

Example 67 includes the subject matter of any one of Examples 58-66, and optionally, comprising processing the Rx radar signals as Rx radar signals of a virtual Uniform Linear Array (ULA) antenna comprising a plurality of virtual antennas, wherein a count of the plurality of virtual antennas is greater than a count of the plurality Rx antennas.

Example 68 includes the subject matter of Example 67, and optionally, wherein each pair of adjacent virtual antennas of the virtual ULA is spaced by no more than half of the wavelength of the central frequency of the Tx radar signal.

Example 69 includes the subject matter of Example 67 or 68, and optionally, wherein the Tx signal comprises a plurality of subcarriers, and wherein the count of the plurality of virtual antennas is based on a count of the plurality of subcarriers.

Example 70 includes the subject matter of any one of Examples 67-69, and optionally, wherein the count of the plurality of virtual antennas is at least 2 times the count of the plurality of Rx antennas.

Example 71 includes the subject matter of any one of Examples 67-70, and optionally, wherein the count of the plurality of virtual antennas is at least 10 times the count of the plurality of Rx antennas.

Example 72 includes the subject matter of any one of Examples 58-71, and optionally, wherein the distance between the first Rx antenna and the second Rx antenna is at least twenty times the wavelength of the central frequency of the Tx radar signal.

Example 73 includes the subject matter of any one of Examples 58-72, and optionally, wherein the distance between the first Rx antenna and the second Rx antenna is at least one hundred times the wavelength of the central frequency of the Tx radar signal.

Example 74 includes the subject matter of any one of Examples 58-73, and optionally, wherein the Tx radar signal is in a frequency band between 77 Gigahertz (GHz) and 81 GHz.

Example 75 includes the subject matter of any one of Examples 58-74, and optionally, wherein the radar antenna comprises a Multiple-Input-Multiple-Output (MIMO) radar antenna comprising a plurality of Tx antennas.

Example 76 includes an apparatus comprising means for transmitting a Tx radar signal via at least one Transmit (Tx) antenna of a radar antenna; means for receiving Rx radar signals via a plurality of Receive (Rx) antennas of the radar antenna based on the Tx radar signal, wherein a distance between a first Rx antenna of the plurality of Rx antennas and a second Rx antenna of the plurality of Rx antennas, which is adjacent to the first Rx antenna, is at least ten times a wavelength of a central frequency of the Tx radar signal; and means for estimating an angle of a target based on the Rx radar signals.

Example 77 includes the subject matter of Example 76, and optionally, comprising means for transmitting the Tx radar signal over a signal Bandwidth (BW), which is at least one percent of the central frequency of the Tx radar signal.

Example 78 includes the subject matter of Example 77, and optionally, wherein the signal BW is at least two percent of the central frequency of the Tx radar signal.

Example 79 includes the subject matter of Example 77 or 78, and optionally, wherein the signal BW is at least five percent of the central frequency of the Tx radar signal.

Example 80 includes the subject matter of any one of Examples 77-79, and optionally, wherein the signal BW is at least 1 Gigahertz (GHz).

Example 81 includes the subject matter of any one of Examples 77-80, and optionally, wherein the signal BW is at least 5 Gigahertz (GHz).

Example 82 includes the subject matter of any one of Examples 76-81, and optionally, comprising means for transmitting the Tx radar signal over a plurality of subcarriers, a subcarrier of the plurality of subcarriers having a wavelength, which is based on a count of the plurality of subcarriers and on the wavelength of the central frequency of the Tx radar signal.

Example 83 includes the subject matter of Example 82, and optionally, wherein the plurality of subcarriers comprises N subcarriers, a k-th subcarrier having a wavelength $\lambda k = N/(k+N)*\lambda c$, wherein $k=1 \ldots N$, and wherein $\lambda c$ is the wavelength of the central frequency of the Tx radar signal.

Example 84 includes the subject matter of Example 82 or 83, and optionally, wherein a distance between the first Rx antenna and a third Rx antenna of the plurality of Rx antennas is based on a minimal wavelength, a maximal wavelength, and a distance between the second Rx antenna and the third Rx antenna, the minimal wavelength corresponding to a lowest subcarrier of the plurality of subcarriers, the maximal wavelength corresponding to a highest subcarrier of the plurality of subcarriers.

Example 85 includes the subject matter of any one of Examples 76-84, and optionally, comprising means for processing the Rx radar signals as Rx radar signals of a virtual Uniform Linear Array (ULA) antenna comprising a plurality of virtual antennas, wherein a count of the plurality of virtual antennas is greater than a count of the plurality Rx antennas.

Example 86 includes the subject matter of Example 85, and optionally, wherein each pair of adjacent virtual antennas of the virtual ULA is spaced by no more than half of the wavelength of the central frequency of the Tx radar signal.

Example 87 includes the subject matter of Example 85 or 86, and optionally, wherein the Tx signal comprises a plurality of subcarriers, and wherein the count of the plurality of virtual antennas is based on a count of the plurality of subcarriers.

Example 88 includes the subject matter of any one of Examples 85-87, and optionally, wherein the count of the plurality of virtual antennas is at least 2 times the count of the plurality of Rx antennas.

Example 89 includes the subject matter of any one of Examples 85-88, and optionally, wherein the count of the plurality of virtual antennas is at least 10 times the count of the plurality of Rx antennas.

Example 90 includes the subject matter of any one of Examples 76-89, and optionally, wherein the distance between the first Rx antenna and the second Rx antenna is at least twenty times the wavelength of the central frequency of the Tx radar signal.

Example 91 includes the subject matter of any one of Examples 76-90, and optionally, wherein the distance between the first Rx antenna and the second Rx antenna is at least one hundred times the wavelength of the central frequency of the Tx radar signal.

Example 92 includes the subject matter of any one of Examples 76-91, and optionally, wherein the Tx radar signal is in a frequency band between 77 Gigahertz (GHz) and 81 GHz.

Example 93 includes the subject matter of any one of Examples 76-92, and optionally, wherein the radar antenna comprises a Multiple-Input-Multiple-Output (MIMO) radar antenna comprising a plurality of Tx antennas.

Example 94 includes an product comprising one or more tangible computer-readable non-transitory storage media comprising computer-executable instructions operable to, when executed by at least one processor, enable the at least one processor to cause a radar device to transmit a Tx radar signal via at least one Transmit (Tx) antenna of a radar antenna; receive Rx radar signals via a plurality of Receive (Rx) antennas of the radar antenna based on the Tx radar signal, wherein a distance between a first Rx antenna of the plurality of Rx antennas and a second Rx antenna of the plurality of Rx antennas, which is adjacent to the first Rx antenna, is at least ten times a wavelength of a central frequency of the Tx radar signal; and estimate an angle of a target based on the Rx radar signals.

Example 95 includes the subject matter of Example 94, and optionally, wherein the instructions, when executed, cause the radar device to transmit the Tx radar signal over a signal Bandwidth (BW), which is at least one percent of the central frequency of the Tx radar signal.

Example 96 includes the subject matter of Example 95, and optionally, wherein the signal BW is at least two percent of the central frequency of the Tx radar signal.

Example 97 includes the subject matter of Example 95 or 96, and optionally, wherein the signal BW is at least five percent of the central frequency of the Tx radar signal.

Example 98 includes the subject matter of any one of Examples 95-97, and optionally, wherein the signal BW is at least 1 Gigahertz (GHz).

Example 99 includes the subject matter of any one of Examples 95-98, and optionally, wherein the signal BW is at least 5 Gigahertz (GHz).

Example 100 includes the subject matter of any one of Examples 94-99, and optionally, wherein the instructions, when executed, cause the radar device to transmit the Tx radar signal over a plurality of subcarriers, a subcarrier of the plurality of subcarriers having a wavelength, which is based on a count of the plurality of subcarriers and on the wavelength of the central frequency of the Tx radar signal.

Example 101 includes the subject matter of Example 100, and optionally, wherein the plurality of subcarriers comprises N subcarriers, a k-th subcarrier having a wavelength $\lambda k = N/(k+N)*\lambda c$, wherein $k=1 \ldots N$, and wherein $\lambda c$ is the wavelength of the central frequency of the Tx radar signal.

Example 102 includes the subject matter of Example 100 or 101, and optionally, wherein a distance between the first Rx antenna and a third Rx antenna of the plurality of Rx antennas is based on a minimal wavelength, a maximal wavelength, and a distance between the second Rx antenna and the third Rx antenna, the minimal wavelength corresponding to a lowest subcarrier of the plurality of subcarriers, the maximal wavelength corresponding to a highest subcarrier of the plurality of subcarriers.

Example 103 includes the subject matter of any one of Examples 94-102, and optionally, wherein the instructions, when executed, cause the radar device to process the Rx radar signals as Rx radar signals of a virtual Uniform Linear Array (ULA) antenna comprising a plurality of virtual antennas, wherein a count of the plurality of virtual antennas is greater than a count of the plurality Rx antennas.

Example 104 includes the subject matter of Example 103, and optionally, wherein each pair of adjacent virtual antennas of the virtual ULA is spaced by no more than half of the wavelength of the central frequency of the Tx radar signal.

Example 105 includes the subject matter of Example 103 or 104, and optionally, wherein the Tx signal comprises a plurality of subcarriers, and wherein the count of the plurality of virtual antennas is based on a count of the plurality of subcarriers.

Example 106 includes the subject matter of any one of Examples 103-105, and optionally, wherein the count of the plurality of virtual antennas is at least 2 times the count of the plurality of Rx antennas.

Example 107 includes the subject matter of any one of Examples 103-106, and optionally, wherein the count of the plurality of virtual antennas is at least 10 times the count of the plurality of Rx antennas.

Example 108 includes the subject matter of any one of Examples 94-107, and optionally, wherein the distance between the first Rx antenna and the second Rx antenna is at least twenty times the wavelength of the central frequency of the Tx radar signal.

Example 109 includes the subject matter of any one of Examples 94-108, and optionally, wherein the distance between the first Rx antenna and the second Rx antenna is at least one hundred times the wavelength of the central frequency of the Tx radar signal.

Example 110 includes the subject matter of any one of Examples 94-109, and optionally, wherein the Tx radar signal is in a frequency band between 77 Gigahertz (GHz) and 81 GHz.

Example 111 includes the subject matter of any one of Examples 94-110, and optionally, wherein the radar antenna comprises a Multiple-Input-Multiple-Output (MIMO) radar antenna comprising a plurality of Tx antennas.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
a processor configured to:
configure a Transmit (Tx) radar signal to be transmitted by at least one Tx antenna over a plurality of subcarriers in a signal Bandwidth (BW), which is at least one percent of a central frequency of the Tx radar signal, wherein a subcarrier of the plurality of subcarriers has a wavelength, which is based on a count of the plurality of subcarriers and on a wavelength of the central frequency of the Tx radar signal; and
generate radar information based on a plurality of Receive (Rx) radar signals received at a plurality of Rx antennas, the plurality of Rx radar signals based on the Tx radar signal, wherein the radar information is based on a distance between a first Rx antenna of the plurality of Rx antennas and a second Rx antenna of the plurality of Rx antennas, which is adjacent to the first Rx antenna; and
a memory to store information processed by the processor.

2. The apparatus of claim 1, wherein the plurality of subcarriers comprises N subcarriers, wherein a k-th subcarrier of the N subcarriers has a wavelength $\lambda k=N/(k+N)*\lambda c$, wherein k=1 . . . N, and wherein $\lambda c$ is the wavelength of the central frequency of the Tx radar signal.

3. The apparatus of claim 1, wherein the plurality of subcarriers corresponds to a respective plurality of wavelengths between a minimal wavelength and a maximal wavelength, wherein the minimal wavelength and the maximal wavelength are based on the distance between the first Rx antenna and the second Rx antenna.

4. The apparatus of claim 1, wherein the processor is configured to estimate an angle of a target based on the plurality of Rx radar signals and the distance between the first Rx antenna and the second Rx antenna.

5. The apparatus of claim 4, wherein the processor is configured to estimate the angle of the target based on phases of the plurality of Rx radar signals over the plurality of subcarriers.

6. The apparatus of claim 1, wherein the processor is configured to process the plurality of Rx radar signals as Rx radar signals of a virtual Uniform Linear Array (ULA) antenna comprising a plurality of virtual antennas, wherein a count of the plurality of virtual antennas is greater than a count of the plurality Rx antennas.

7. The apparatus of claim 6, wherein each pair of adjacent virtual antennas of the virtual ULA is spaced by no more than half of the wavelength of the central frequency of the Tx radar signal.

8. The apparatus of claim 6, wherein the count of the plurality of virtual antennas is based on a count of the plurality of subcarriers.

9. The apparatus of claim 6, wherein the count of the plurality of virtual antennas is at least 2 times the count of the plurality of Rx antennas.

10. The apparatus of claim 6, wherein the count of the plurality of virtual antennas is at least 10 times the count of the plurality of Rx antennas.

11. The apparatus of claim 1, wherein the signal BW is at least two percent of the central frequency of the Tx radar signal.

12. The apparatus of claim 1, wherein the signal BW is at least five percent of the central frequency of the Tx radar signal.

13. The apparatus of claim 1, wherein the signal BW is at least 1 Gigahertz (GHz).

14. The apparatus of claim 1, wherein the signal BW is at least 5 Gigahertz (GHz).

15. The apparatus of claim 1, wherein the distance between the first Rx antenna and the second Rx antenna is at least ten times the wavelength of the central frequency of the Tx radar signal.

16. The apparatus of claim 1, wherein the distance between the first Rx antenna and the second Rx antenna is at least twenty times the wavelength of the central frequency of the Tx radar signal.

17. The apparatus of claim 1, wherein the distance between the first Rx antenna and the second Rx antenna is at least one hundred times the wavelength of the central frequency of the Tx radar signal.

18. The apparatus of claim 1, wherein the processor is configured to cause a transmitter to transmit the Tx radar signal via the at least one Tx antenna.

19. The apparatus of claim 1, wherein the Tx radar signal is in a frequency band between 77 Gigahertz (GHz) and 81 GHz.

20. A product comprising one or more tangible computer-readable non-transitory storage media comprising instructions operable to, when executed by at least one processor, enable the at least one processor to cause a radar device to:
configure a Transmit (Tx) radar signal to be transmitted by at least one Tx antenna over a plurality of subcarriers in a signal Bandwidth (BW), which is at least one percent of a central frequency of the Tx radar signal, wherein a subcarrier of the plurality of subcarriers has a wavelength, which is based on a count of the plurality of subcarriers and on a wavelength of the central frequency of the Tx radar signal; and
generate radar information based on a plurality of Receive (Rx) radar signals received at a plurality of Rx antennas, the plurality of Rx radar signals based on the Tx radar signal, wherein the radar information is based on a distance between a first Rx antenna of the plurality of Rx antennas and a second Rx antenna of the plurality of Rx antennas, which is adjacent to the first Rx antenna.

21. The product of claim 20, wherein the plurality of subcarriers comprises N subcarriers, wherein a k-th subcarrier of the N subcarriers has a wavelength $\lambda k = N/(k+N)*\lambda c$, wherein k=1 . . . N, and wherein $\lambda c$ is the wavelength of the central frequency of the Tx radar signal.

22. The product of claim 20, wherein the instructions, when executed, cause the radar device to estimate an angle of a target based on the plurality of Rx radar signals and the distance between the first Rx antenna and the second Rx antenna.

23. The product of claim 20, wherein the instructions, when executed, cause the radar device to process the plurality of Rx radar signals as Rx radar signals of a virtual Uniform Linear Array (ULA) antenna comprising a plurality of virtual antennas, wherein a count of the plurality of virtual antennas is greater than a count of the plurality Rx antennas.

\* \* \* \* \*